United States Patent [19]

Gurr

[11] 4,346,432
[45] Aug. 24, 1982

[54] RECTIFIER CONTROLLER RESPONSIVE TO SENSED A.C. VOLTAGE SIGNALS

[75] Inventor: George P. Gurr, Dunwoody, Ga.

[73] Assignee: Sangamo Weston, Inc., Atlanta, Ga.

[21] Appl. No.: 54,025

[22] Filed: Jul. 2, 1979

[51] Int. Cl.³ .................................... H02M 7/155
[52] U.S. Cl. .................. 363/129; 307/510; 361/56; 363/58
[58] Field of Search ............... 307/232, 252 Q, 510; 323/22 SC, 24, 34, 119, 244; 361/55, 56, 76, 91; 363/34, 37, 96, 129, 137, 58

[56] References Cited

U.S. PATENT DOCUMENTS

| | | | |
|---|---|---|---|
| 3,253,189 | 5/1966 | Wouk | 361/55 |
| 3,863,134 | 1/1975 | Pollard | 363/137 X |
| 4,000,455 | 12/1976 | Gyugyi et al. | 323/119 |
| 4,017,744 | 4/1977 | Johnson | 323/22 SC |
| 4,028,607 | 6/1977 | Watanabe | 363/96 X |
| 4,084,205 | 4/1978 | Bohnert | 361/76 |
| 4,188,663 | 2/1980 | Okawa et al. | 363/96 X |
| 4,215,394 | 7/1980 | Galloway et al. | 363/137 |

Primary Examiner—A. D. Pellinen
Attorney, Agent, or Firm—Saidman & Sterne

[57] ABSTRACT

A rectifier controller for controlling bridge connected silicon control rectifiers (SCRs) (1 to 6) of a three-phase rectifier which is used to supply a direct current (DC) voltage to an inverter (314) used for injecting pulse coded audio frequency signals on a power line. The controller supplies gate control signals to the SCRs (1 to 6) of the rectifier bridge in accordance with the envelope of the three-phase supply voltages and provides for protection of the inverter (314) when shoot-through conditions occur in the inverter (314) and provides for output DC voltage adjustment by controlling the firing time of the rectifier bridge SCRs.

22 Claims, 9 Drawing Figures

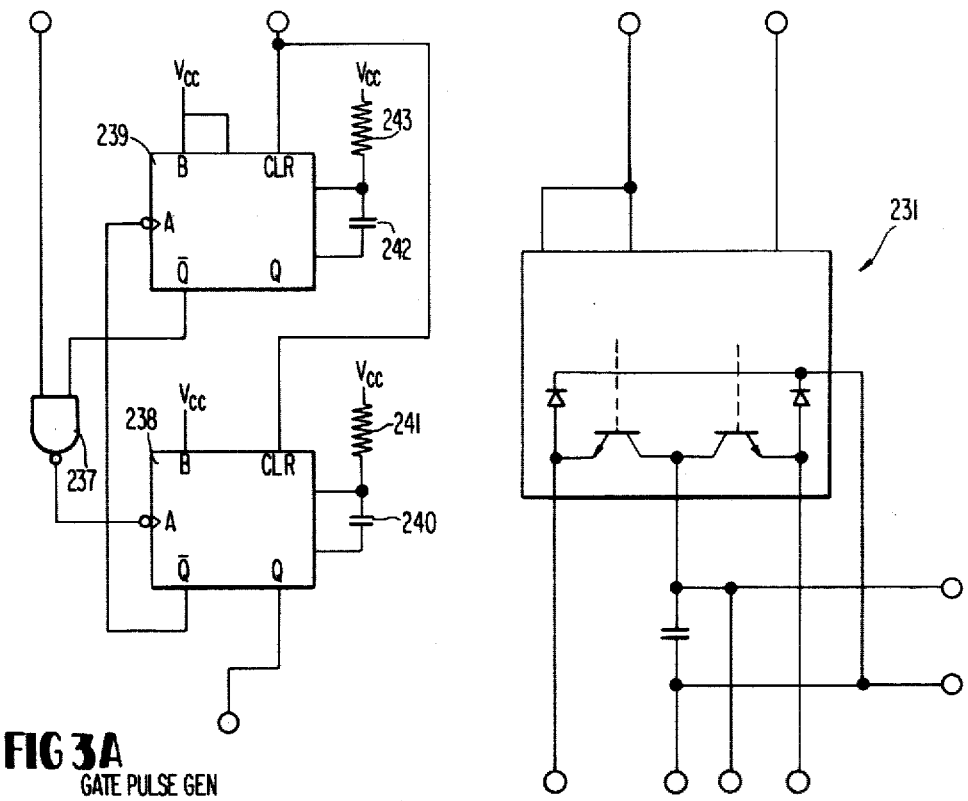
FIG 3A GATE PULSE GEN
FIG 3B GATE AMPLIFIER
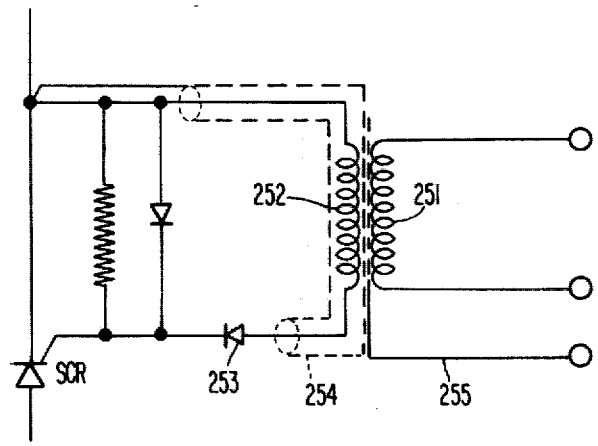
FIG 3C ISOLATION TRANSFORMER

RECTIFIER CONTROLLER RESPONSIVE TO SENSED A.C. VOLTAGE SIGNALS

BACKGROUND OF THE INVENTION

1. Field of the Invention

The present invention relates to a rectifier controller which is used to control conduction controlled rectifiers connected to provide a direct current voltage source for an inverter that is used, in turn, to generate a pulse code signal utilized in utility load management systems.

2. Description of the Prior Art

In a rectifier and inverter system described in an article entitled "Pulse Coded Inverter For Utility Load Management System," by James H. Galloway and Alby M. Berman in the IAS 1977 Annual published by the I.E.E.E., the rectifier used to supply direct current to the inverter silicon controlled rectifiers (SCRs) is of a conventional design. This rectifier supplies current to the direct current bus without any provision for removing the direct current bus voltage during a condition of shoot-through in the inverter SCRs, and without any means to rapidly respond to circuit conditions in the load. This conventional rectifier merely gates the rectifier SCRs in accordance with the three-phase input voltages.

The conventional rectifier is basically an analog device, and is not compatible with systems which utilize digital microprocessor control techniques.

OBJECTS OF THE INVENTION

It is one object of the present invention to provide a new and improved rectifier controller for controlling solid state gate controlled rectifiers that produce a direct current voltage signal for an inverter that is used, in turn, to generate a pulse code signal for a utility load management system.

Another object of the present invention is to provide means for controlling a rectifier in a rectifier-inverter assembly which responds to single and multiple shoot-through conditions on the direct current (DC) bus to prevent damage to the solid state devices of the inverter.

A further object of the present invention is to provide a rectifier controller which permits external control and interface with a microprocess-based digital logic control system.

An additional object of the present invention is to provide means for controlling a three-phase power line solid state rectifier circuit which rectifies according to the envelope of the three-phase alternating current (AC) input voltage waveforms.

Another object of the present invention is to provide a rectifier controller which responds to microprocessor-initiated commands for adjusting its DC output voltage level.

SUMMARY OF THE INVENTION

The rectifier controller of this invention provides for external control and interface with a digital logic control system. This rectifier controller further utilizes digital control techniques with isolation means such as opto-isolators to isolate the low voltage digital circuitry from the high power and high voltages associated with utility power line systems.

This rectifier controller provides for rectification in accordance with the envelope produced by the three-phase voltage inputs. In this control, there is a means for detecting when each of these three-phase voltages is more positive than the other two, and for detecting when each of the three-phase voltages is more negative. The rectifier SCRs are fired in accordance with which three-phase voltage is most positive and in accordance with which is most negative.

Still further, this rectifier controller is capable of rapid response to fault or shoot-through conditions which may occur within the inverter which is connected to the rectifier output. A detector and associated logic circuitry provides for turning off the rectifier SCRs whenever a shoot-through condition exists on the direct current output bus. There is also a means provided to disable the rectifier if a continuous overload current occurs.

The rectifier controller is also capable of adjusting the direct current output voltage in accordance with commands received from a microprocessor or master control unit which is utilized for controlling the rectifier and inverter. This adjustment provides a dwell time or delay in the firing of the rectifier SCRs which is determined by counting down a number stored in a register.

This rectifier controller dwell raises and lowers the direct current applied to the direct current bus which feeds the inverter SCRs.

This rectifier controller also contains a counter and logic means which will completely shut down the rectifier controller and turn off the entire system if a sufficient number of shoot-throughs are detected within a predetermined time interval. When the counter determines that there has been a sufficient number of shoot throughs or faults in a time interval, a shutdown latch will prevent further operation of the controller. This protects the inverter SCRs when numerous faults occur within said predetermined time.

DESCRIPTION OF THE DRAWINGS

FIG. 2 illustrates diagrammatically the relationship between FIGS. 2A, 2B and 2C.

FIG. 3A shows a gate pulse generator which is used to drive the SCR gates of the rectifier.

FIG. 3B shows a power amplifier which is also used to drive the rectifier SCR gates.

FIG. 3C shows an isolation transformer which is connected to the SCR gates of the rectifier for the purpose of isolating the logic circuitry from the high voltage present in the rectifier, and for noise suppression.

DETAILED DESCRIPTION OF THE PREFERRED EMBODIMENT

Figure 1:
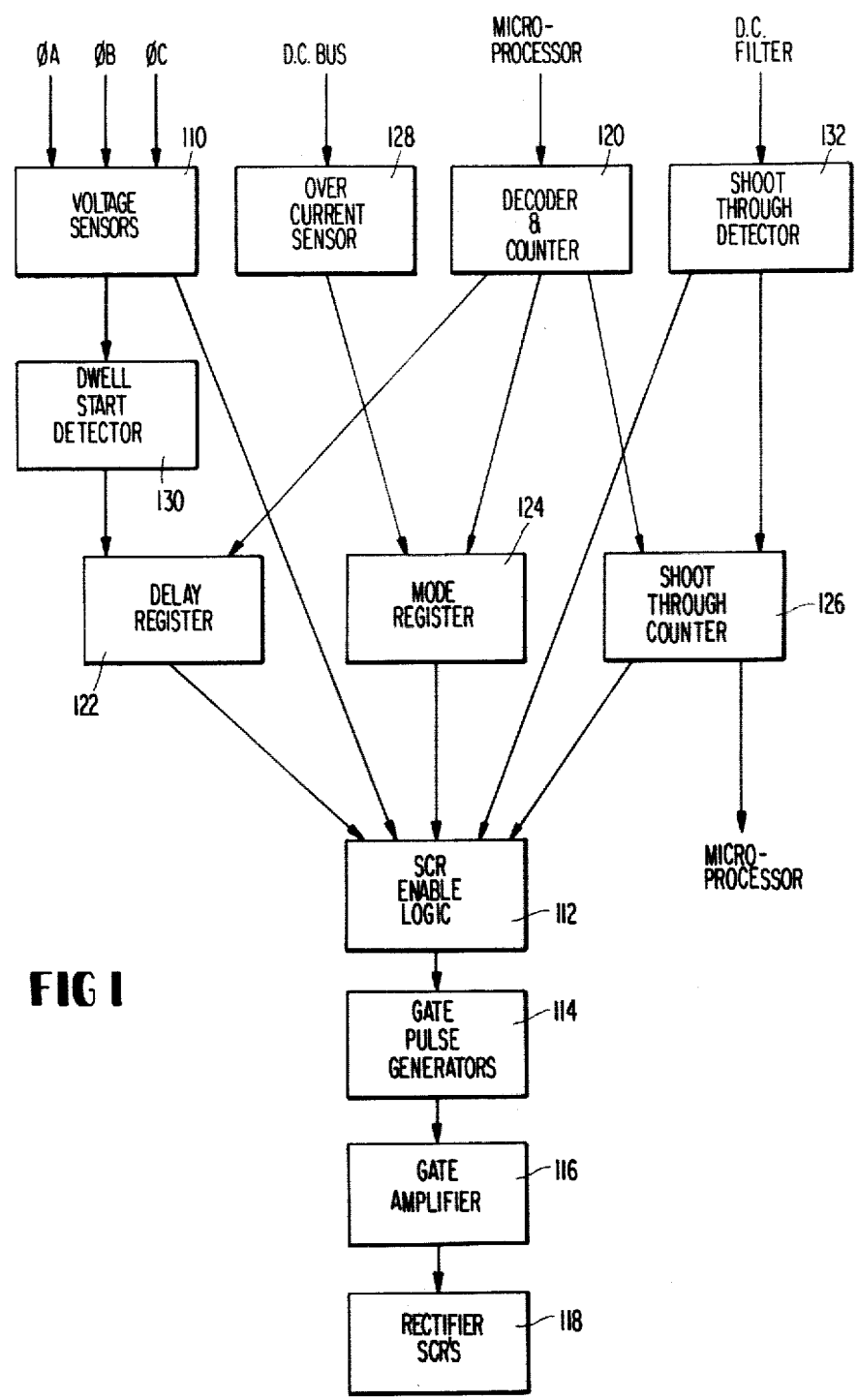
FIG. 1 shows an overall functional block diagram of the rectifier controller with inputs and outputs.

There is shown in FIG. 1 a functional block diagram of the rectifier controller. The rectifier controller utilizes voltage sensors 110 to detect the more positive voltages by comparing the instantaneous magnitude of phase voltages A, B and C from the three-phase power grid. The phases of the three voltages must be rotating positively from A to B to C. The voltage sensors 110 produce outputs whenever one line is positive with respect to another line with which it is compared. The voltage sensors are connected to the SCR enabling logic 112 in order to determine the firing order of the SCRs.

The same information required for determining the firing order is fed to a dwell start detector 130. The dwell start detector is responsive to the outputs of voltage sensors 110 to produce an output whenever any two of the three-phase voltages are equal.

A delay register 122 is responsive to the dwell start detector 130 output and to time delay information from a decoder and counter 120 which receives output voltage signals from a microprocessor. If the time delay received from decoder 120 is zero, then the delay register 122 will immediately enable logic 112. When this condition exists, the rectifier will produce a full power output. The reason for this is that, in this event, the SCR enabling logic 112 will be time controlled only by the voltage sensors 110 since there is no dwell time delay. As the length of the time delay increases from zero, the firing of the SCRs will be delayed by the output from delay register 122.

The decoder and counter 120 also provides an input to a mode register 124. This mode register 124 is responsive to a mode command from the microprocessor through decoder 120 to deliver an appropriate signal to SCR enabling logic that is used to initiate and terminate operation of the rectifier controller upon command from the microprocessor or when there are other rectifier controller malfunctions.

During normal operation, the rectifier controller operates in response to commands from the microprocessor which are received by the decoder and counter 120 and in response to the three-phase voltages which are sensed by the voltage sensors 110. The commands from the delay register 122, the voltage sensors 110, and the mode register 124 under normal operation will permit firing of the rectifier SCRs by enabling logic 112.

Connected to the output of the SCR enabling logic 112 are gate pulse generators 114 which are utilized to generate bursts of high frequency pulses which may be, for example, on the order of 50 kilohertz. These pulses are then applied to gate amplifiers 116 which are used to increase the power level and to drive the rectifier SCRs 118. The rectifier SCRs have isolation transformers associated with their gates. These isolation transformers necessitate the use of the 50 kilohertz gate pulse generators 114 since in order to pass through the transformers, there must be an alternating current signal for the gate control.

The rectifier controller also has associated with it additional means for controlling the SCR enabling logic 112 which are responsive to conditions on the DC bus. These means are an overcurrent sensor 128 and a shoot-through detector 132.

The overcurrent sensor 128 is placed in the direct current bus and senses a high direct current for sustained periods of time. This sensor may be, for example, a thermally responsive switch which closes to apply a signal to the mode control register 124 which will produce a disabling signal which is received by the SCR enabling logic 112.

In order to provide for rapid control of the rectifier direct current output voltage when a shoot-through occurs in the SCRs associated with the inverter circuitry, there is provided a shoot-through detector 132. A "shoot-through" is the undesirable condition which may occur in the inverter circuit when two series connected SCRs operating on the same voltage phase are simultaneously placed in conduction which produces a short circuit on the direct current bus. The shoot-through detector 132 responds to this short circuit condition on the direct current bus and produces a signal responsive to the short circuit condition. The shoot-through detector 132 is connected to the SCR enabling logic 112. When such a shoot-through condition is sensed, the SCR enabling logic 112 immediately disables the SCR gates, and thereby prevents any further power from being applied to the direct current bus during the period of the shoot-through condition. The SCR enabling logic 112 maintains the gates in their "off" condition for a predetermined period of time. This provides time for the inverter to recover from its undesirable shoot-through condition.

Shoot-through conditions may occur randomly in inverter circuits. The shoot-through detector 132 and the SCR enabling logic 112 permit the rectifier to be protected against damage from such random conditions. If the shoot-through condition becomes persistent and repetitive, there may be a serious fault associated with the inverter circuit's rectifiers. In order to determine if such serious and continuous shoot-through conditions are present, there is provided a shoot-through counter 126. The shoot-through counter 126 counts the number of shoot-through detections within a given time interval. When a predetermined number of shoot-throughs is detected within the predetermined period, the shoot-through counter 126 produces a shut down signal which is received by SCR enabling logic 112. The SCR enabling logic 112 will then permanently shut down the SCR gates until a microprocessor-initiated or manually initiated command is received to clear the fault and restart the rectifier. The shoot-through counter 126 also provides fault data supplied to the microprocessor which is used to control the rectifier controller as well as the inverter.

Figure 2A:
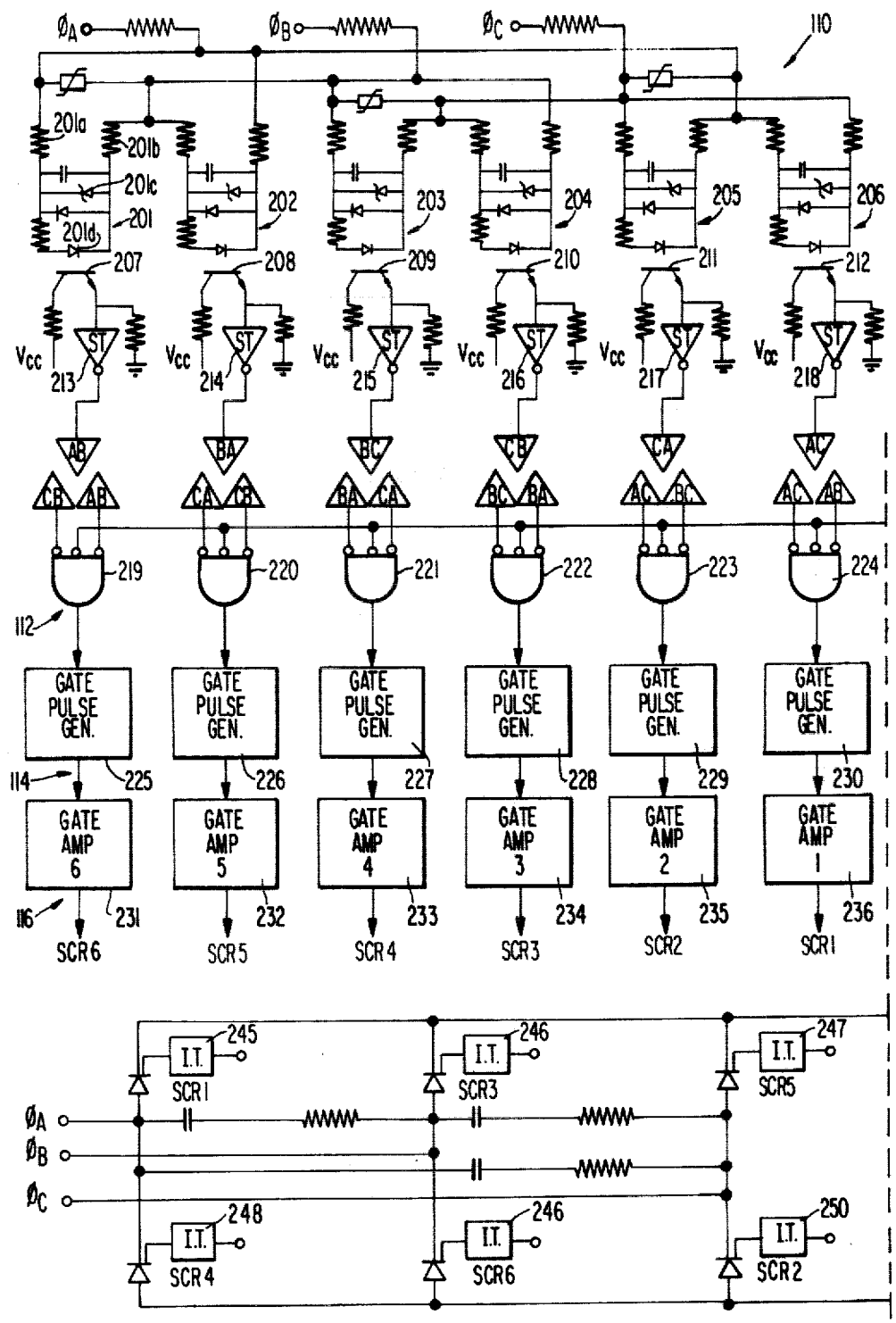
FIG. 2A shows the input portion of the rectifier controller, the portion of the logic circuit that controls the gate signals, the gate driving section, and the three-phase rectifier SCR bridge.
Figure 2B:
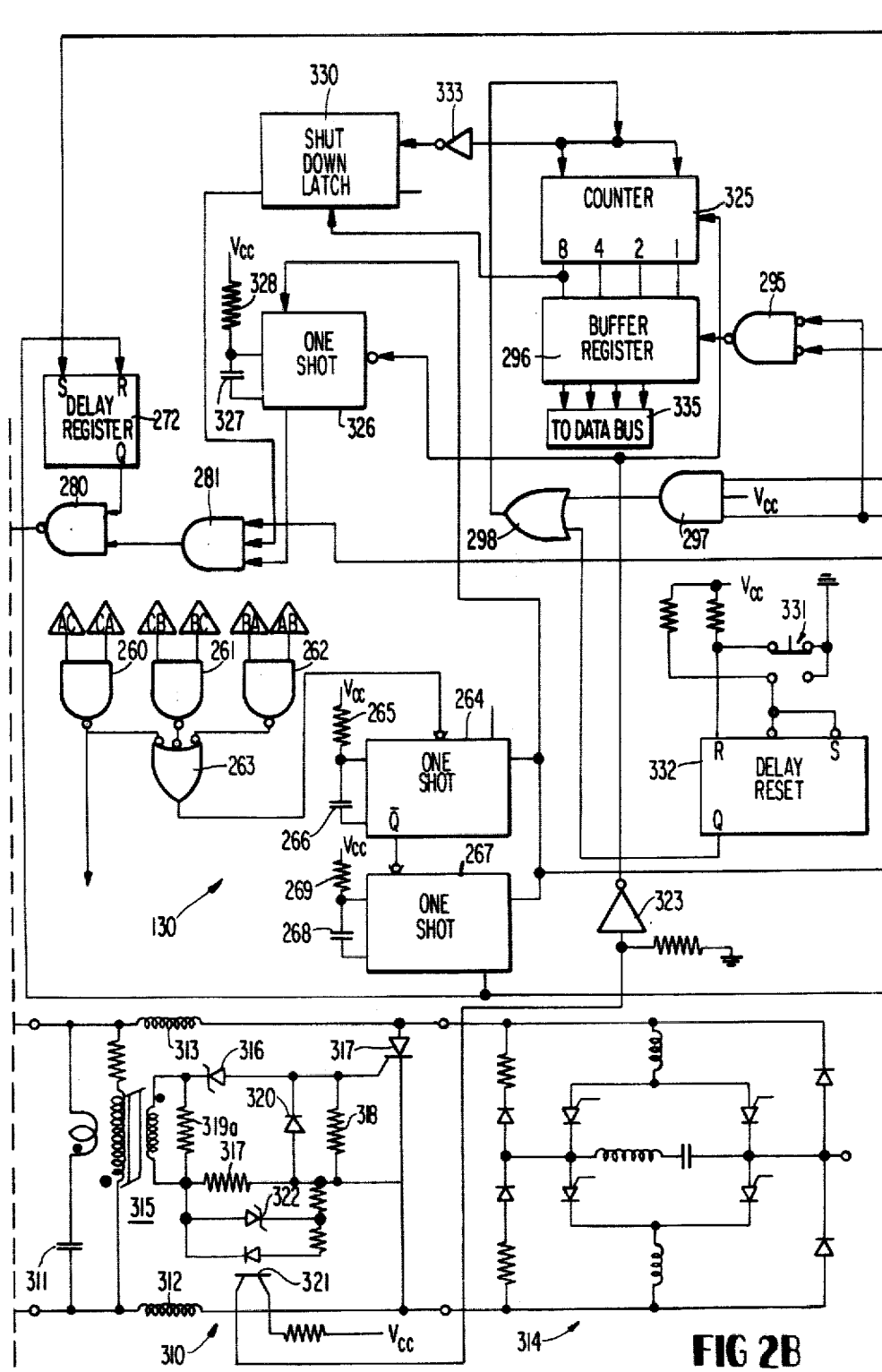
FIG. 2B includes the shoot-through counter section, the means for determining dwell start, the shoot-through detector, and a simplified representation of one phase of the inverter rectifiers.
Figure 2C:
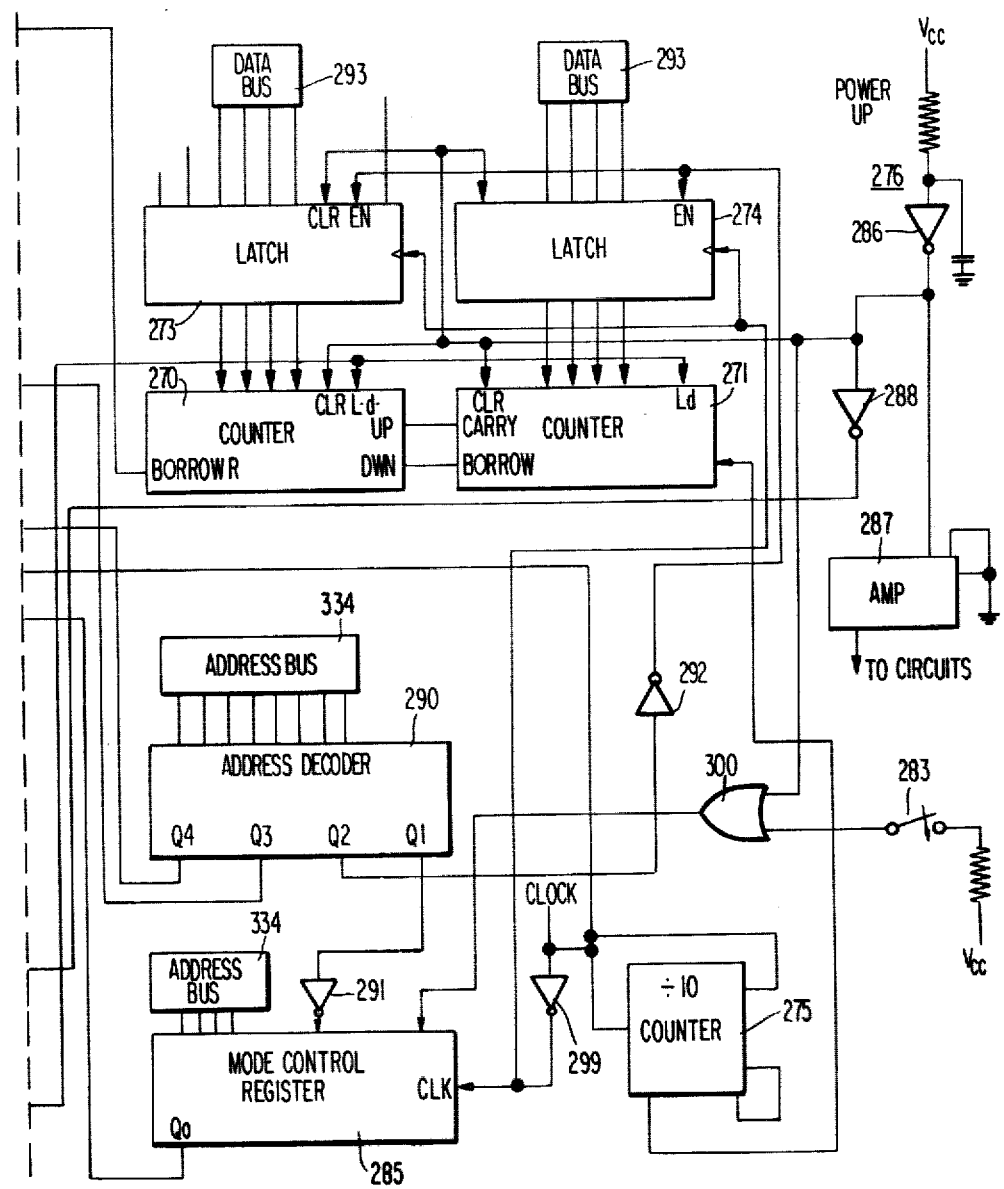
FIG. 2C shows the input section of the controller which provides communication with the microprocessor which is used to control the overall operation of the inverter and rectifier.

FIGS. 2A through 2C illustrate the overall schematic of the rectifier controller of the present invention. In the upper portion of FIG. 2A are illustrated the voltage sensors 110 which receive the three-phase input voltages A, B and C from the power bus of the utility. In order to provide inputs for the SCR enabling logic circuit 112, the voltage sensors 110 generate logic signals which indicate which phase voltages are positive at any point in time with respect to the others. By way of example, a comparison between the phase voltages A and B is made by voltage sensor 201. When voltage A is positive with respect to voltage B, current will flow through a light emitting diode 201d of an opto-isolator 207 which conducts to deliver a voltage VCC to the input of a Schmitt trigger 213 to fire same. When the Schmitt trigger 213 fires, an output AB is produced which indicates that phase voltage A is positive with respect to phase voltage B. Associated with the voltage sensor 201 are current limiting resistors 201a and 201b and a Zener diode 201c which limits the voltage across the opto-isolator 207.

The voltage sensors for the other possible combinations of three-phase lines are indicated by reference numerals 202, 203, 204, 205 and 206. Similarly, the outputs of these voltage comparisons are shown as BA, BC, CB, CA and AC. Each of these sensors produces an enabling output when the first indicated voltage is greater than the second indicated voltage.

As shown in FIG. 2A, NAND gates 219 through 224 have inputs connected to the indicated outputs of Schmitt triggers 213 through 218 and will produce the necessary firing information for the SCRs. The inputs to NAND gate 219 include the outputs from Schmitt triggers 216 (CB) and 213 (AB). With these inputs, NAND gate 219 will produce an output when voltage B is the most negative of the three-phase input voltages. Similarly, NAND gate 220 will have an output when voltage C is the most positive; NAND gate 221 will have an output when voltage A is the most negative; NAND gate 222 will have an output when voltage B is the most positive; NAND gate 223 will have an output when voltage C is the most negative; and NAND gate 224 will have an output when voltage A is the most positive.

The NAND gates 219–224 are a portion of the logic means for supplying gate control signals to the SCRs 1 through 6. In addition to the information from the voltage detectors 110, there is a third input to each NAND gate 219 through 224, to be described in greater detail below, which further controls the firing time of SCRs 1 to 6.

The outputs of NAND gates 219 through 224 are connected to gate pulse generators 225 through 230. The gate pulse generators may each comprise, for example, 50 kilohertz oscillators which are controlled by the outputs from gates 219 through 224. FIG. 3A shows a preferred embodiment of a single gate pulse generator. This gate pulse generator consists of two one-shot pulse generators 238 and 239 and a NAND gate 237 which receives as one input thereto the output from one of the NAND gates 219 through 224. NAND gate 237 provides an input to one-shot 238 which fires for a time determined by capacitor 240 and resistor 241. The output of one-shot 238 is then fed to one-shot 239 which then fires and remains on for a period determined by capacitor 242 and resistor 243. When one-shot 239 returns to its normal state, the output to NAND gate 237 again goes high, and one-shot 238 is again triggered, thereby producing the oscillation required at its $\overline{Q}$ output. The value of capacitor 240, resistor 241, capacitor 242, and resistor 243 are chosen so that the frequency of the oscillator will be approximately 50 kilohertz.

The output of the gate pulse generator of FIG. 3A is then applied to a gate amplifier or driver as illustrated in FIG. 3B. Gate amplifiers 231 through 236 are all the same and preferably comprise integrated circuit transistor amplifiers. The outputs from the transistor amplifiers are then applied to the inputs of the various SCRs through isolation transformers.

The isolation transformers are identified by reference numerals 245 through 250 in FIG. 2A. A preferred embodiment of an isolation transformer for the SCR gates is depicted in FIG. 3C and has the outputs from a gate amplifier applied to transformer winding 251 to develop a gate output signal on transformer winding 252. A diode 253 is connected in series with the secondary of the transformer 252 to provide rectification of the 50 kilohertz signal which is necessary for proper control of the SCR gate. The isolation transformer also includes a coaxial shield 254 on the secondary and a Faraday shield 255 to prevent triggering of the SCR by noise that can be capacitively fed through the transformer.

Referring now to FIG. 2B, the means for generating a dwell start output signal comprises NAND gates 260, 261 and 262 which serve as a voltage comparing means and whose outputs feed a NOR gate 263. NAND gate 260 is connected to receive the outputs from Schmitt trigger 218 and Schmitt trigger 217. The inputs to NAND gate 260 indicate when voltage A is greater than voltage C and when C is greater than voltage A. The only time it is possible for both inputs to NAND gate 260 to go high at the same time is when voltage A is approximately equal to voltage C. This condition may be detected by virtue of the design of opto-isolators 211 and 212 which operate in conjunction with Schmitt triggers 217 and 218 to provide a near-zero threshold detection. When this condition occurs, there will be a low output from NAND gate 260 which is fed to enable NOR gate 263. The low output of NOR gate 263 is inverted and fed to trigger a one-shot 264. One-shot 264 has a time constant associated with resistor 265 and capacitor 266 which is preferably approximately 2.5 milliseconds long. The on time of this one-shot is selected by the fact that it must be reset before the next anticipated signal is received from NOR gate 263. The one-shot 264 triggers on the pulse received from NOR gate 263. Connected to the output of one-shot 264 is a second one-shot 267 which puts out a pulse for approximately 1 microsecond which is determined by the time constant of capacitor 268 and resistor 269.

The one-shot 264 in combination with the one-shot 267 functions as a noise suppression circuit. The one-shot 264 upon receiving a trigger pulse from NOR gate 263 changes state, and produces an output continuously for a relatively long time period set by capacitor 266 and resistor 265. Any extraneous signals or noise received by one-shot 264 during this time period will be ignored because one-shot 264 has not yet been reset. As the output of one-shot 264 goes high, the output of one-shot 267 goes high immediately producing the one microsecond pulse which is determined by capacitor 268 and resistor 269. Therefore, the one-shots 264 and 267 provide noise suppression while generating a precise one microsecond pulse every time the magnitude of two of the three-phase voltage signals A, B and C are equal.

Referring now to FIG. 2C, the output of one-shot 267 is connected to counters 270 and 271 and a flip-flop 272 (FIG. 2B). The counters 270 and 271 receive the output from one-shot 267 at their load terminals. When a pulse is received from one-shot 267, the counters 270 and 271 are loaded with the information in the form of a number from latches 273 and 274. The number which is placed in the counters 270 and 271 from the latches 273 and 274 is used to set the dwell time of the rectifier controller.

The number retained by latches 273 and 274 is obtained from the data bus 293 of the microprocessor. This number, as stated above, gives control over the dwell angle by providing a delay in the firing time of the SCRs 1 through 6.

The counter 271 is supplied with a clock pulse which is provided by a divide-by-10 counter 275. The input to the counter 275 is a one microsecond clock pulse which is received from the microprocessor. Therefore, the output of the divide-by-10 counter 275 is a pulse every 10 microseconds. The time delay produced by counters 270 and 271 is therefore the number set in (which is counted down) times 10 microseconds. The other input to the counters 270 and 271 is the input from the power up circuit 276. This resets the counter when the unit is activated.

The output of counter 270 is connected to the S terminal of a flip-flop 272 (FIG. 2B) which serves as a dwell delay register and has its reset terminal R connected to receive the output of one-shot 267. The flip-flop 272 is reset each time one-shot 267 delivers a one microsecond pulse to the reset terminal R. If the number set into counters 270 and 271 is zero, then the flip-flop 272 will be reset and set immediately and there will be no delay in the output Q of delay register 272 and therefore no direct current voltage reduction.

The output Q of flip-flop 272 provides a dwell angle control signal as an input to a NAND gate 280. The other input to NAND gate 280 is from NAND gate 281 which supplies other necessary conditions for enabling NAND gates 219 through 224 in order to fire SCRs 1 through 6.

A current sensing dry reed relay 283 (FIG. 2C) is provided to sense overload current in the direct current bus. When switch 283 closes, an overload signal is sent through OR gate 300 to a mode control register 285 which changes the input to NAND gate 281 and disables the gates 219 through 224 that control the gate pulse generators.

A power up circuit is generally designated at 276 and includes a connection to the power bus voltage VCC which feeds through an inverter 286 and to an amplifier 287. The amplifier 287 provides sufficient gain in order to supply the additional circuits, such as the gate pulse generators 225 through 230 and the gate amplifiers 231 through 236. Inverter 286 also provides a power up signal to the mode control register 285 through OR gate 300. The output of inverter 286 is also used to clear counters 270, 271 and latches 273, 274.

An address decoder 290 receives address information from the address bus 334 which is supplied from the microprocessor that controls the operation of the rectifier controller. The address decoder 290 produces outputs to control the various modes and functions of the rectifier controller. The Q1 output from address decoder 290 is fed to the mode control register 285 through an inverter 291. The Q2 output from the address decoder 290 is fed through an inverter 292 to the enable inputs of latches 273 and 274.

The Q2 output of address decoder 290 is used to trigger the latches 273 and 274 in order to allow them to receive data from the data bus 293. In this manner, a number is set in the latches 273 and 274 which is observed by the counters 270 and 271 for generating the dwell or delay signal which is sent to delay register or flip-flop 272.

The Q3 output from address decoder 290 is applied to a NAND gate 295 along with the one microsecond clock signal from the microprocessor. The output Q3 is used to enable NAND gate 295 in order to read data from a buffer register 296, which is connected to receive the output from NAND gate 295.

The Q4 output from address decoder 290 is applied to one input of a NAND gate 297 which also has as its other input the clock signal from the microprocessor. The Q4 output is used to reset a counter 325 and a shutdown latch 330 through an OR gate 298. This operation is effected by a clear fault command from the microprocessor.

The mode control register 285 has a single output Q0 which is connected directly to NAND gate 281, and is the primary enabling mode for the rectifier. The inputs to the mode control register 285 are information from address bus 334 and the clock signal from the microprocessor which is inverted by inverter 299 to be applied to the clock terminal of mode control register 285. Also connected to the mode control register 285 is the output from OR gate 300 which is received whenever there is an overload in the direct current bus which is sensed by switch 283, or whenever the power up signal from inverter 286 indicates that there is a power failure. In this manner, the mode control register 285 may be disabled.

The rectifier controller includes means for responding to a shoot-through detector 310, the latter being placed in the direct current bus between the rectifier SCRs and the inverter controller SCRs which comprise the load. As shown in FIG. 2B, the shoot-through detector 310 has a capacitor 311 placed across the direct current bus and inductors 312 and 313 on the direct current bus. If a shoot-through should occur within the inverter which is indicated generally by reference numeral 314, there will be an apparent short circuit on the direct current bus which will cause an immediate discharge of capacitor 311. As capacitor 311 discharges, the current from capacitor 311 will be sensed by a saturable core transformer 315 which generates in its secondary a voltage related to the shoot-through condition current of capacitor 311. Within the transformer secondary there is placed a Zener diode 316 which acts as a threshold device, and which permits only voltages above its Zener voltage to be applied to the gate of an SCR 317 and to the loop consisting of resistors 318 and 319.

A resistor 319a is placed across the secondary of transformer 315 to provide a current path in parallel with the detector circuit which reduces sensitivity and absorbs energy which is insufficient to overcome Zener 316. In this manner, the response of SCR 317 is limited to a predetermined Zener voltage, and likewise the voltage across resistor 319 is controlled. A diode 320 is placed across the gate cathode terminals of SCR 317 and, along with resistor 318, acts to suppress noise that may induce spurious triggering of SCR 317.

The SCR 317 provides an additional margin of safety to the SCRs located in the inverter 314. SCR 317 will be turned on when the Zener voltage of diode 316 is exceeded. The turning on of SCR 317 essentially short circuits the direct current bus, and takes the current which would otherwise flow to the inverters SCRs. In this manner, the direct current bus is rapidly disabled in response to a shoot-through condition. The shorting of the output direct current bus combined with the disabling of the gates of the rectifier bridge assures that the rectifier bridge SCRs 1 to 6 will turn off.

The voltage across resistor 319 is applied to an opto-isolator 321 which serves to sense the voltage across resistor 319 and to isolate this high power section from the logic circuitry which is connected to the output of opto-isolator 321. A Zener diode 322 is placed across the opto-isolator 321 which limits the voltage applied to the opto-isolator 321.

The output voltage from opto-isolator 321 is applied to Schmitt trigger 323 whose output is connected to a counter 325 and a one-shot 326.

The one-shot 326 has inputs from Schmitt trigger 323 and from the power up indicator 288. One-shot 326 produces a pulse of approximately 50 microseconds in duration which is used to disable the rectifier. The output of one-shot 326 is applied to one terminal of AND gate 281. In this manner, each time there is a fault detected as indicated by an output from Schmitt trigger 323, one-shot 326 will disable the gates of all of the rectifier SCRs by the action of AND gate 281 and NAND gate 280 which feed the center inputs to NAND gates 219 through 224. The time of operation of one-shot 326 is determined by the time constant of capacitor 327 and resistor 328 and is set to the recovery time desired.

Occasional shoot-through conditions will be handled automatically by the one-shot 326. However, when persistent failures in the form of continuous shoot-through conditions occur, it is desirable that the rectifier controller and hence rectifier circuit be completely shut down, and restarted either in response to a manual reset or in response to a command from the microprocessor. In order to provide for such multiple shoot-through protection, the output of Schmitt trigger 323 is also applied to counter 325 which counts the pulses from the Schmitt trigger, each pulse indicating detection of one shoot-through, until a predetermined number is reached. When a count of 8 is obtained, for example, an output from counter 325 is delivered at pin 8, and is applied to a shutdown latch 330. When the shutdown latch 330 goes low, its output, which is connected to AND gate 281, will disable the entire rectifier gate control system by way of NAND gate 280 and NAND gates 219 through 224.

One way of clearing the shutdown latch is by means of switch 331 (FIG. 2B). Switch 331 when closed produces an output from a delay reset 332 at terminal Q. The output from terminal Q is applied to an OR gate 298 and hence to the reset input of counter 325. This same signal is also applied to open the shutdown latch 330 through an inverter 333. In this manner, the counter 325 is reset, and the shutdown latch 330 is opened to permit normal operation of the rectifier controller.

It is also possible to clear a fault by resetting counter 325 and shutdown latch 330 in response to a command from the address bus which is received from the microprocessor. A clear fault command when received on the address bus 334 is decoded in decoder 209, and a clear fault output signal is sent from terminal Q4 of address decoder 290 to one input of NAND gate 297. The other input of NAND gate 297 is the one microsecond clock from the microprocessor. The output of NAND gate 297 is then fed through OR gate 298 and hence to the counter 325 and shutdown latch 330 to accomplish the clear fault function as set forth above.

Connected to the counter 325 is a buffer register 296 which feeds to an output data bus 335 a count indicating the number of the shoot-throughs detected. When the microprocessor desires information relating to shoot-through conditions, an appropriate address is received by address decoder 290 to provide an output from terminal Q3. This output is applied through NAND gate 295 which places the count in register 296 on the data bus 335 for delivery to the microprocessor.

OPERATION

The rectifier controller operates in a normal mode wherein rectification is continuously achieved, and the output on the direct current bus is steady. During normal operation, the NAND gates 219 through 224 are controlled in accordance with the detectors 201 through 206 which produce signals indicative of whether one voltage is greater than or equal to another. Certain NAND gates 219 through 224 are enabled whenever one phase voltage is more positive than the other two phase voltages, or when one phase voltage is more negative than the other two phase voltages. Firing signals are therefore generated in accordance with the most positive and most negative phase voltages.

Figure 4:
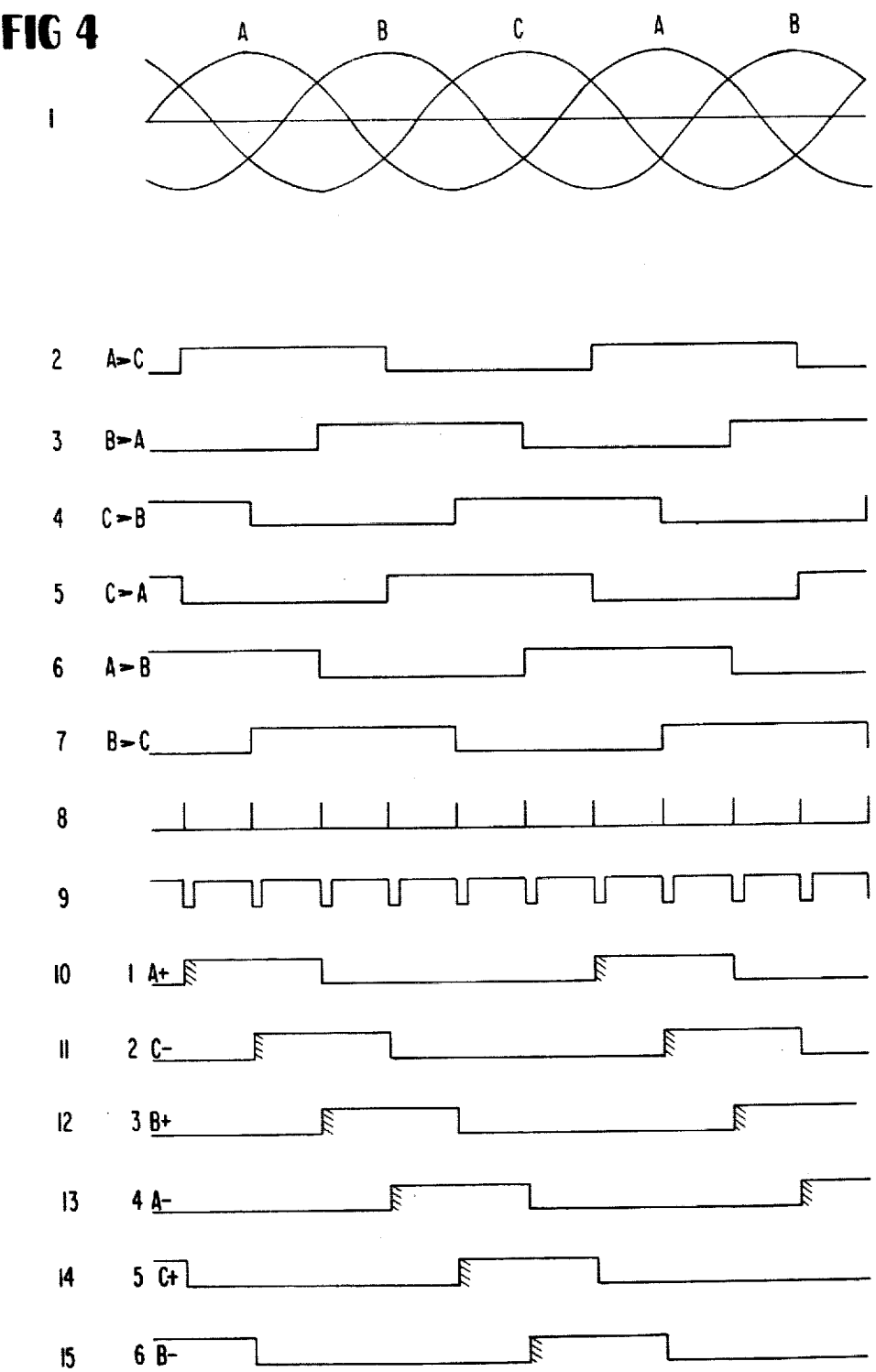
FIG. 4 shows the timing diagrams which illustrate the dwell start detection, the firing order of the SCRs which produce the envelope following firing pattern, and the detection of relative positive and negative phase voltages.

Referring now to FIG. 4, the rectifier controller in normal operation controls the silicon controlled rectifiers 1 to 6 of the rectifier bridge and fires each SCR of the rectifier bridge when its input phase voltage is more positive or more negative than any other input phase voltage. Curves 1 shows the three-phase voltages A, B and C. Further, in order to provide output voltage adjustment, there is a dwell or delay applied to the firing of each SCR in accordance with a command which is received from the microprocessor control unit. In normal operation the firing order is controlled by the determination of which voltage is most positive and the firing time is controlled by the dwell.

In addition to normal operation, the rectifier controller is also responsive to abnormal conditions, such as shoot-through conditions occurring in the inverter (which comprises the load), the number of shoot-throughs that occur within a period of time, direct current bus current overloads, and input power failures.

Referring now to FIGS. 2 and 4, the phase A, B and C voltages are shown as curves 1. The voltage sensing means 201 through 206 receive as inputs each of the three input phase voltages A, B and C and Schmitt triggers 213 through 218 produce outputs which indicate when a particular voltage is more positive than another. Waveform 2 of FIG. 4 shows the output of Schmitt trigger 218 which is high when the voltage A is greater than the voltage C. Comparison of curves 1 and waveform 2 in FIG. 4 shows that the output of Schmitt trigger 218 goes high when A crosses C to become more positive than C and remains high until A again crosses C to become more negative than C. Similarly, waveform 3 represents the output of Schmitt trigger 214, while waveform 4 represents the output of Schmitt trigger 216 and waveform 5 represents the output of Schmitt trigger 217. Waveform 6 represents the output of Schmitt trigger 213 and waveform 7 represents the output of Schmitt trigger 215.

The rectifier controller, absent a dwell signal and absent any abnormal conditions or faults, will produce gate control signals whenever any phase voltage A, B or C is more positive than any other phase voltage, and similarly will produce gate control outputs when any phase voltage A, B or C is more negative than any other phase voltage. Waveform 10 of FIG. 4 shows the signal to be applied to the gate of SCR 1 which occurs when phase voltage A is more positive than any of the other voltages. Waveform 10, when considered without dwell, is generated by NAND gate 224 in response to the inputs from Schmitt triggers 218 and 213. These Schmitt trigger outputs are shown as waveforms 2 and 6. Therefore, the NAND gate 224 produces an output when waveform 2 is high and when waveform 6 is high.

This output coincides with the time period wherein voltage A is more positive than voltages B or C as may be verified by comparing waveform 10 with curves 1 in FIG. 4.

In a similar fashion, the control voltages for gates 2, 3, 4, 5, and 6, shown by waveforms 11, 12, 13, 14 and 15 which represent respectively C most negative, B most positive, A most negative, C most positive, and B most negative, are generated in accordance with the inputs to their respective NAND gates 219 through 223 which are received from the respective Schmitt triggers 213 through 218 as shown on FIG. 2A and in the waveforms 2 through 7 of FIG. 4.

In order to achieve a dwell which will provide control of the output direct current voltage by adjusting the firing time of SCRs 1 through 6, it is necessary to delay or retard the firing of each individual SCR. The desired output voltage or dwell time is commanded by the microprocessor control unit and is received by the rectifier controller. A dwell start output signal is generated by comparator NAND gates 260, 261 and 262 which apply their outputs to OR gate 263. As can be seen with reference to waveform 8, whenever the two voltage inputs to any of the NAND gates 260 through 262 both high, there is an output. By way of example, NAND gate 260 has as inputs the outputs from Schmitt triggers 218 and 217 which represent respectively voltage A greater than voltage C and voltage C greater than voltage A. When voltage A approximately equals voltage C, NAND gate 260 will produce a pulse. As can be seen in FIG. 4, waveform 2, which represents voltage A greater than voltage C, and waveform 5, which represents voltage C greater than voltage A, go respectively high and low at the point where waveform 8 produces a short pulse indicating this condition.

The detection of the equal points produces a dwell start output signal from one-shot 267 which is fed to the reset input R of delay register 272. This dwell start output signal is shown as waveform 8 of FIG. 4. In order to complete the dwell function, it is necessary then to retard the firing of the SCRs 1 through 6 for a predetermined period of time. This is accomplished by the rectifier controller by use of counters 270 and 271 which count down a number received from the microprocessor data bus 293. When the countdown of the number is complete, the flip-flop 272 changes state, and thereby enables the gate 280 which in turn enables gates 219 through 224 in order to permit firing of the appropriate SCRs. If the number set in the counters 270 and 271 is zero, then the firing will occur immediately since the dwell angle is zero. Waveform 9 of FIG. 4 shows the output of dwell delay register 272. The shaded portion of waveforms 10 to 15 show the portions of the gate control signals that are removed by the dwell delay.

In addition to normal operation, the rectifier controller also provides for rapid response to abnormal conditions and monitors continuous abnormal conditions in order to provide protection to the inverter which is depicted by reference numeral 314. The shoot-through detector 310 produces an output when a shoot-through occurs in the SCRs of the inverter 314. The detection is produced by the sudden surge of current from capacitor 311 which is sensed by transformer 315, and which produces a voltage across resistor 319. The voltage across resistor 319 is sensed by opto-isolator 321 which is connected to Schmitt trigger 323 which produces an output pulse. The output pulse from Schmitt trigger 323 indicates a shoot-through condition has occurred in the inverter 314. Once a shoot-through is detected, one-shot 326 fires and inhibits gate 281 which in turn removes the input from gates 219 through 224 which removes all gate control signals from SCRs 1 through 6. In this manner, whenever a shoot-through occurs, the rectifier will be turned off for a predetermined period of time in accordance with the timing of one-shot 326.

In addition to the short term turn off achieved through one-shot 326, if a continuous series of shoot-throughs occur, the system will automatically shut down until it is manually restarted by switch 331, or until such time as a restart or clear fault command is received from the address bus 334 and the microprocessor. This operation is achieved through counter 325 which is also connected to the output of Schmitt trigger 323. When the counter 325 counts a predetermined number, such as 8, shut down latch 330 inhibits gate 281 which in turn inhibits gates 219 through 224. Through this mode of operation, continuous shoot-through detection will shut down the rectifier until an order from an outside source is received to restart the rectifier.

Also responsive to the shoot-through condition is an SCR 317 which is used to short circuit the direct current bus during a shoot-through condition. The gate of SCR 317 is again controlled by the same shoot-through detection that produces the inhibit signals to the firing gates of the rectifier SCRs.

Other protection is provided through information supplied to the mode control register 285 which indicates whether power is properly up from power source 276, or whether there is a direct current bus overload which is sensed by switch 283.

The mode control register 285 is again responsive to information on address bus 334 which receives the mode command from the microprocessor to produce the output at terminal Q0 of register 285 which is used to enable gate 281 in normal operation.

Obviously, numerous modifications and variations of the present invention are possible in light of the above teachings. It is therefore to be understood that within the scope of the appended claims, the invention may be practiced otherwise than as specifically described herein.

What is claimed is:

1. A controller for a rectifier of first, second and third phase alternating current voltage signals for supplying a controlled direct current voltage to a load, said rectifier including three pairs of solid state gate controlled rectifying devices connected in a bridge configuration to a common output bus, each of said pair of devices connected to receive one of said first, second or third phase voltage signals to rectify both the positive half and negative half of the respective applied voltage signal, which comprises:

means for detecting comprising voltage detection means for receiving said first, second and third voltage signals and for providing six outputs when respective ones of said voltage signals are greater than ones of the others of said voltage signals; and means for providing gate control signals comprising logic means responsive to said six outputs for providing a first set of three gate control signals for indicating which of said voltage signals are most positive at any point in time, and for providing a second set of three gate control signals for indicating which of said voltage signals are most negative at any point in time, said first set of three gate control signals connected to be applied to the gates of one of said devices in each pair, said second set of three gate control signals connected to be applied to the gates of the other of said devices in each pair.

2. A rectifier controller as set forth in claim 1, wherein said logic means is further responsive to comparator means also responsive to said voltage signals for generating a dwell output signal each time any pair of said voltage signals are equal.

3. A rectifier controller as set forth in claim 2, further comprising:
means connected to said logic means and responsive to an input command for delaying the generation of said first and second sets of gate control signals for a predetermined time period.

4. A rectifier controller as set forth in claim 3, wherein said means responsive to an input command comprises:
means for receiving said input command;
counter means connected to said means for receiving said input command for counting a number in accordance with said input command and for providing a count output signal when said number has been counted; and
means connecting said count output signal to said logic means to delay said gate control signals in time in accordance with the time period required to count said number.

5. A rectifier controller as set forth in claim 4, wherein said means connecting said count output signal to said logic means comprises a flip-flop which is set in response to said count output signal and which is reset in response to said dwell output signal.

6. A rectifier controller as set forth in claim 1, further comprising means responsive to said controlled direct current voltage and connected to said logic means for removing said gate control signals when said controlled direct current voltage drops below a predetermined level.

7. A rectifier controller as set forth in claim 6, wherein said means responsive to said controlled direct current voltage comprises:
detection means connected to said output bus for detecting a predetermined change in the level of said controlled direct current voltage
and
time delay means responsive to the output of said detection means for disabling said gate control signals for a predetermined period of time.

8. A rectifier controller as set forth in claim 7, further including:
second counter means for counting each detection of said predetermined change in said level of said controlled direct current voltage, and for producing an output when a predetermined number of detections have been counted; and
means for shutting down said rectifier in response to said output from said second counter means within a predetermined time.

9. A rectifier controller as set forth in claim 6, further including means responsive to said means for removing said gate control signals for short circuiting said output bus.

10. A rectifier controller as set forth in claim 9, wherein said means for short circuiting comprises a gate controlled rectifier having a control electrode and having anode and cathode electrodes connected across said output bus.

11. A rectifier controller as set forth in claim 6, wherein said means responsive to said controlled direct current voltage for removing said gate control signals comprises:
a capacitor connected to said output bus;
means for sensing the current flow through said capacitor; and
means responsive to said means for sensing for producing a control voltage of a predetermined time period, and for controlling said gate control signals in accordance with said predetermined time period.

12. A rectifier controller as set forth in claim 1 wherein said six outputs from said voltage detection means comprise:
a first output when said first phase voltage signal is greater than said second phase voltage signal;
a second output when said second phase voltage signal is greater than said first phase voltage signal;
a third output when said second phase voltage signal is greater than said third phase voltage signal;
a fourth output when said third phase voltage signal is greater than said second phase voltage signal;
a fifth output when said third phase voltage signal is greater than said first phase voltage signal; and
a sixth output when said first phase voltage signal is greater than said third phase voltage signal.

13. A rectifier controller as set forth in claim 12, wherein said logic means includes a plurality of gate means each having as two inputs thereto two of said six outputs from said detecting means.

14. A rectifier controller as set forth in claim 13, wherein said plurality of gate means includes first, second, third, fourth, fifth and sixth gates, the two inputs to said first gate comprising said first and fourth inputs, the two inputs to said second gate comprising said fourth and fifth outputs, the two inputs to said third gate comprising said second and fifth outputs, the two inputs to said fourth gate comprising said second and third outputs, the two inputs to said fifth gate comprising said third and sixth outputs and the two inputs to said sixth gate comprising said first and sixth outputs.

15. A rectifier controller as set forth in claim 14, wherein said first, second, third, fourth, fifth and sixth gates each include a common third input which acts to inhibit said gate control signals in response to disable signals from:
means for time-delaying said gate control signals for adjusting the magnitude of said controlled direct current voltage;
means for detecting a shoot-through condition on said output bus;
means for detecting a plurality of shoot-through conditions on said output bus;
means responsive to a command signal for turning off said rectifier;
means for detecting a current overload on said output bus; and
means for detecting an input power failure.

16. A rectifier controller as set forth in claim 15, wherein said means for detecting a shoot-through condition acts to disable said rectifier for a relatively short, predetermined period of time.

17. A rectifier controller as set forth in claim 15, wherein said means for detecting a plurality of shoot-through conditions acts to turn off said rectifier until such time as an external clear command is provided or a manual switch is actuated.

18. A controller for a rectifier of first, second and third phase A.C. voltage signals for supplying a controlled direct current voltage to an output bus, said rectifier including three pairs of gate controlled rectifying devices connected in a bridge configuration to said output bus, each of said pair of devices connected to receive one of said first, second or third phase voltage signals to rectify both the positive and negative halves of the respective voltage signal, which comprises:

means for detecting comprising six voltage detector means, each of said voltage detector means being responsive to a pair of said voltage signals for supplying an output signal having a first binary state when one of said pair of voltage signals is greater than the other of said pair of voltage signals; and logic means comprising six binary logic means, each of said binary logic means connected to a pair of said voltage detector means for generating a gate control signal when each of said output signals from said pair of voltage detector means is in said first binary state.

19. A rectifier controller as set forth in claim 18, wherein each of said voltage detector means comprises:

opto-isolator means connected to receive said pair of voltage signals for providing a logic signal when one of said pair of voltage signals is greater than the other of said pair of voltage signals; and Schmitt trigger means connected to said opto-isolator means for producing said output signal in response to said logic signal.

20. A rectifier controller as set forth in claim 18, further comprising:

means for generating a high frequency pulse signal in accordance with said gate control signal; and means for converting said high frequency pulse signal into a D.C. gate control signal, and for providing said D.C. gate control signal to one of said gate controlled rectifying devices.

21. A rectifier controller as set forth in claim 20, wherein said means for generating a high frequency pulse signal comprises:

gate pulse generator; and a gate amplifier connected to receive the output from said generator.

22. A rectifier controller as set forth in claim 20, wherein said means for converting said high frequency pulse signal comprises:

isolation transformer means having a first winding for receiving said high frequency pulse signal and a second winding; and means connected to said second winding for rectifying said high frequency pulse signal.

* * * * *